D. J. SCHULTE.
CAR COUPLING.
No. 11,556. Reissued July 7, 1896.
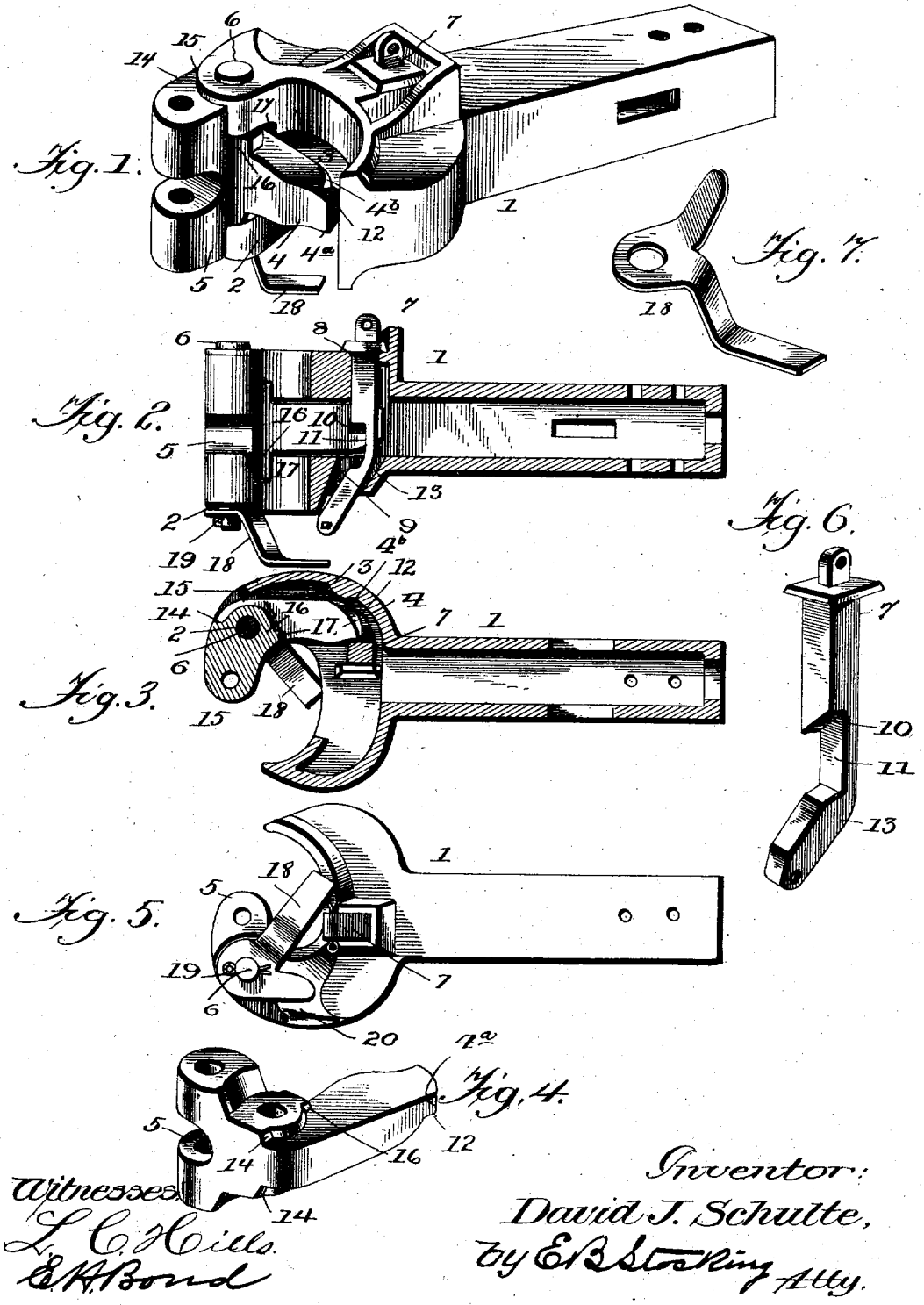
Witnesses:
L. C. Hills.
E. A. Bond
Inventor:
David J. Schulte,
by E. B. Stocking Atty.

UNITED STATES PATENT OFFICE.

DAVID JULIUS SCHULTE, OF LATROBE, PENNSYLVANIA.

CAR-COUPLING.

SPECIFICATION forming part of Reissued Letters Patent No. 11,556, dated July 7, 1896.

Original No. 549,159, dated November 5, 1895. Application for reissue filed January 18, 1896. Serial No. 576,045.

*To all whom it may concern:*

Be it known that I, DAVID JULIUS SCHULTE, a citizen of the United States, residing at Latrobe, in the county of Westmoreland and State of Pennsylvania, have invented certain new and useful Improvements in Car-Couplings, of which the following is a specification, reference being had therein to the accompanying drawings.

This invention relates to improvements in car-couplings.

The object of the present invention is to improve the construction of car-couplings of the Janney type; to render the automatic operation of coupling positive, easy of action, so constructed as never to work hard, and to prevent the knuckle from being forced outward or laterally of the draw-head when two cars come together for coupling.

A further object of the invention is to relieve the knuckle-pin of strain in backing, to prevent the knuckle-pin from being broken, and to provide means for preventing two draw-heads from separating and one of them dropping to the track in event of such draw-head becoming detached from its car.

The invention consists in the construction and novel combination and arrangement of parts hereinafter fully described, illustrated in the accompanying drawings, and pointed out in the claims hereto appended.

In the drawings, Figure 1 is a perspective view of a car-coupling constructed in accordance with this invention, the knuckle being open. Fig. 2 is a longitudinal sectional view, the knuckle being closed. Fig. 3 is a horizontal sectional view. Fig. 4 is a detail perspective view of the knuckle in reverse position to that shown in the remaining figures. Fig. 5 is a reverse plan view of the car-coupling. Fig. 6 is a detail perspective view of the catch, and Fig. 7 is a similar view of the supporting-arm.

Like numerals of reference indicate corresponding parts in all the figures of the drawings.

1 designates a draw-head having the general configuration of the draw-heads of the Janney type, and provided at one side with upper and lower knuckle-pin-receiving eyes 2, and provided with a horizontal opening 3 to receive an arm 4 of a knuckle 5, which is pivoted in the usual manner by a knuckle-pin 6, passing through the said eyes and through a perforation of the knuckle.

The arm of the knuckle is adapted to be engaged and locked by a substantially vertically-disposed catch 7, consisting of a bar arranged in openings 8 and 9 of the top and bottom of the draw-head and located in rear of the knuckle. The bar is provided with a recess, and has an inclined shoulder 10 at the top of the recess 11, adapted to be engaged by an inclined shoulder 12 of the knuckle-arm 4, whereby the knuckle in closing is adapted to engage and lift the catch and pass beyond the same. The knuckle-arm has a long circular incline $4^a$, which works in conjunction or connection with the recess 11 and the inclined shoulder 10 of the locking-pin, so as to cause the said locking-pin to move vertically and rearwardly at the same time with ease and positiveness. This knuckle-arm is formed further with a short curved incline $4^b$, as seen best in Fig. 1, which serves to aid in lifting the locking-pin 7 as the knuckle is moved upon its pivot. After the arm passes beyond the inclined shoulder 10 at the top of the recess 11, the catch falls and locks the knuckle in its closed position. The lower portion of the catch is inclined at 13, and the lower opening 9 of the draw-head is correspondingly inclined, extending upward and inward, whereby when the catch is raised it moves vertically and rearwardly to release the arm of the knuckle to permit the latter to open. The lower end of the catch is provided with a perforation receiving a key to limit the upward movement of the catch, and any suitable means may be provided for enabling the catch to be lifted to effect the operation of uncoupling from the top, sides, or platform of a car.

The knuckle is provided at its outer side with shoulders 14, formed by recessing the boss surrounding the eye of the knuckle, and arranged to engage corresponding shoulders 15 at the side of the draw-head to limit the opening of the knuckle and to prevent the same from being swung outward when two draw-heads come together for coupling. The knuckle is provided at its inner side with shoulders 16, arranged to bear against corresponding shoulders 17 of the draw-head to relieve the knuckle-pin of strain when cars are being backed, and the shoulders 17 of the draw-head are located in rear of the knuckle-pin at points above and below the arm 4 of the knuckle.

The crooked locking pin or catch 7 with its incline 13 and its inclined shoulder 10, acting in conjunction with the knuckle-arm and the inclined wall of the opening 9 of the draw-head, constitutes a triple incline which makes the locking pin or catch move easily and positively vertically and rearwardly at the same time, thus making automatic coupling easy and positive.

In order to prevent the draw-head from falling to the track in event of its being pulled out from its car, it is provided with a substantially L-shaped bracket 18, constructed of a single piece of material and adapted to be readily attached to any ordinary draw-head of the Janney type without altering the construction of the car-coupling. The bracket comprises a downwardly-extending arm and a horizontally-disposed portion located beneath the draw-head at the space in rear of the knuckle at the center of the draw-head, whereby it is adapted to support a draw-head to prevent the same from dropping out of engagement with the draw-head with which it is coupled and falling upon the track and wrecking cars. The bracket is provided at its top with an enlargement, having a perforation for the reception of the lower end of a knuckle-pin, whereby the device is adapted to be readily attached to any ordinary draw-head of the Janney type, and is readily removable therefrom when desired. It is retained on the lower end of the knuckle-pin by a key 19, and it is prevented from rotating and becoming displaced by a rearwardly and upwardly extending arm 20, conforming to the configuration of the bottom of the draw-head and fitting in a recess or indentation of the bottom of the draw-head and locking the bracket rigidly in position.

It will be seen that the car-coupling is simple and inexpensive in construction, that its automatic operation is positive and reliable, and that the knuckle-pin is supported or relieved from strain in backing to prevent the same from being broken or otherwise injured.

It will also be apparent that a simple and inexpensive device is provided for preventing a draw-head from becoming uncoupled and dropping upon the track in event of its becoming detached from its car, and that the device is readily applicable to draw-heads of the Janney type, and is rigidly held in proper position.

Changes in the form, proportion, and the minor details of construction may be resorted to without departing from the principle or sacrificing any of the advantages of this invention.

What I claim as new is

1. In a car-coupling of the class described, a locking-pin having a substantially straight vertical portion inclined forward at its lower end, the vertical portion being formed with a recess having an inclined shoulder at its upper end, combined with a knuckle-arm having a long incline and an independent short incline at its inner end; substantially as described.

2. The combination with the locking-pin having inclined lower end and a recess or opening in its vertical portion with inclined upper wall, of the long circular incline on the end of the knuckle-arm, which works in connection with the opening and inclines on the locking-pin, which makes the locking-pin move vertically and rearwardly at the same time with ease and without fail; substantially as described.

3. The combination with the knuckle-arm having at its inner end a long incline and an independent short incline of a locking-pin, having a substantially straight body portion and having an opening to receive the knuckle-arm and at the upper part of said opening in the locking-pin an incline, and from the lower part of said opening in the locking-pin to the lower end of the locking-pin an incline, the opening in the locking-pin with the upper and lower inclines being used in connection with the long circular incline on the end of the knuckle-arm forming a triple incline, and making the locking-pin move vertically and rearwardly at the same time, thereby making automatic coupling easy and positive; substantially as described.

4. A supporting device for car-couplings designed to be arranged at the bottom thereof and consisting of a substantially L-shaped bracket provided at its top with a knuckle-pin opening, whereby the device is adapted to be readily applied to any ordinary draw-head having a knuckle, and the rearwardly and upwardly extending arm located at the top of the bracket and conforming to the configuration of the lower face of the draw-head, and adapted to fit in a recess or indentation to lock the device against pivotal movement on the knuckle-pin; substantially as described.

5. A supporting device for car-couplings designed to be arranged at the bottom thereof and constructed of a single piece of material, and consisting of a substantially L-shaped bracket provided at its top with a knuckle-pin opening, whereby the device is adapted to be readily applied to any ordinary draw-head having a knuckle, and the rearwardly and upwardly extending arm located at the top of the bracket and conforming to the configuration of the lower face of the draw-head, and adapted to fit in a recess or indentation to lock the device against pivotal movement on the knuckle-pin; substantially as described.

6. In a car-coupling, the combination with a locking-pin, having transverse opening, with inclined upper walls, with the lower end of the pin inclined and adapted for coöperation with an inclined wall in the lower portion of the draw-head, and a knuckle-arm provided with adjacent long and short inclines; substantially as and for the purpose specified.

In testimony whereof I have signed my name to the foregoing specification, in the presence of two subscribing witnesses, on this 16th day of January, 1896.

DAVID JULIUS SCHULTE.

Witnesses:
G. C. SWANEY,
J. B. SCHULTE.